March 18, 1924.
A. J. BROOKINS
TRAIN CONTROL SIGNAL
Filed April 15, 1921    2 Sheets-Sheet 1
1,486,946
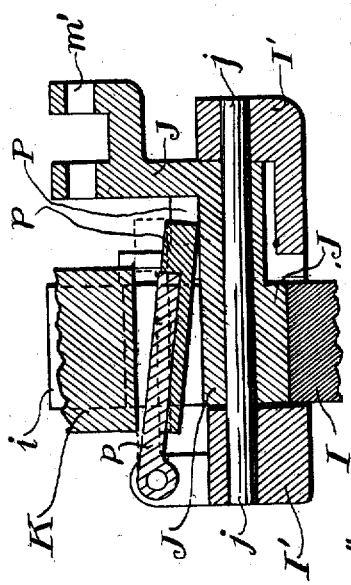
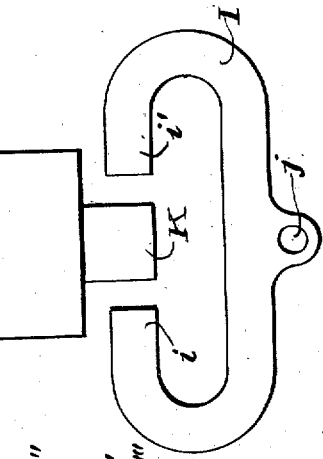
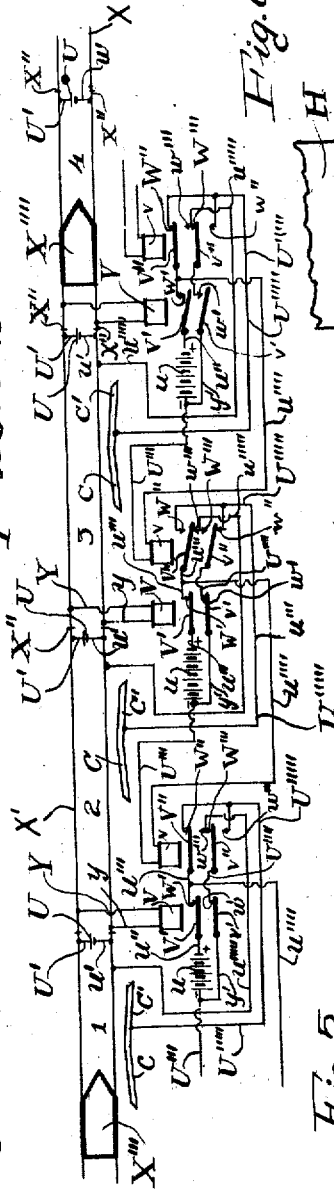
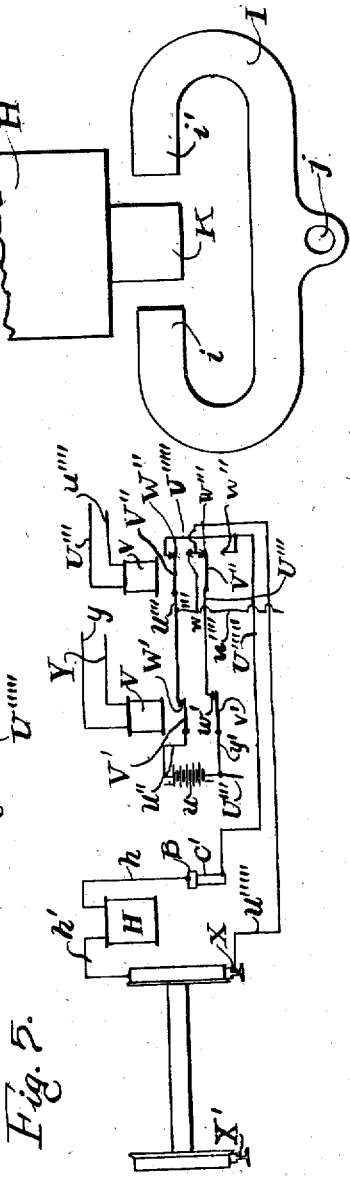
Witness
Inventor
Andrew J. Brookins,
By Charles Turner Brown,
Atty.

March 18, 1924.    1,486,946
A. J. BROOKINS
TRAIN CONTROL SIGNAL
Filed April 15, 1921   2 Sheets-Sheet 2

Witness
Geo. L. Lawrence

Inventor
Andrew J. Brookins,
By Charles Turner Brown,
Atty.

Patented Mar. 18, 1924.

1,486,946

UNITED STATES PATENT OFFICE.

ANDREW J. BROOKINS, OF CHICAGO, ILLINOIS.

TRAIN-CONTROL SIGNAL.

Application filed April 15, 1921. Serial No. 461,529.

*To all whom it may concern:*

Be it known that I, ANDREW J. BROOKINS, a citizen of the United States, and a resident of Chicago, in the county of Cook and State of Illinois, have invented certain new and useful Improvements in Train-Control Signals, of which the following, reference being had to the drawings accompanying and forming a part hereof, is a specification.

This invention relates to train control apparatus whereby there is exhibited in the cab of an engine or motor a signal which indicates to the engineer or motorman, that the block of track on which he is entering or about to enter, is clear, or that he must proceed with caution, or that there is danger ahead, said signals corresponding with the actual conditions of the track in blocks or sections towards which the engine or motor is advancing. Control apparatus of this class also is designed so that when selected signals are displayed desired results are automatically effected.

Among the objects of this invention is to obtain a magnetically controlled movable member which is locked in a neutral position when the electrical circuit controlling an electro-magnet which is arranged to selectively move said controlling member, is not energized, to obtain means to move said controlling member into a neutral position at stated intervals along the track of a railroad, and thereby cancelling or destroying existing signals, to continuously maintain the signal corresponding to the track conditions until the engine or motor arrives at the succeeding stated interval, and to give or make a signal corresponding with the condition of the track about to be entered upon immediately subsequent to the above recited cancellation of existing signals, to obtain means to unlock said controlling member from its neutral position immediately prior to its selective movement to a position corresponding with the condition of the trackway.

Additional objects are hereinafter set forth and claimed.

In the drawings referred to I illustrate mechanical means to "set" the controlling member in neutral position, mechanical means to lock said member in said neutral position, electro-magnetic means to unlock said member while in said neutral position, electro-magnetic means depending on the condition of the trackway of a given number of sections in advance of the engine or motor, to selectively move said controlling member to determined positions, and permanent magnetic means to hold said controlling member in its selected position until the above named mechanical means, positioned at stated intervals along the track, as recited, returns it to neutral position, and to automatically lock it in said neutral position until electro-magnetically unlocked.

Fig. 1 is a diagrammatic view of track side installations by means of which a cab carried electro-magnetic member is selectively energized or de-energized, corresponding with the condition of the track in determined blocks.

Fig. 4 is an enlarged vertical section of the lock member and associated parts.

Fig. 5 is an electric symbol indicating the electro and permanent magnets entering into the construction embodying the invention; and Fig. 6 is a diagrammatic view of the cab carried members entering into the circuit formed thereby in combination with track side installations illustrated and hereinafter described.

Figure 2:
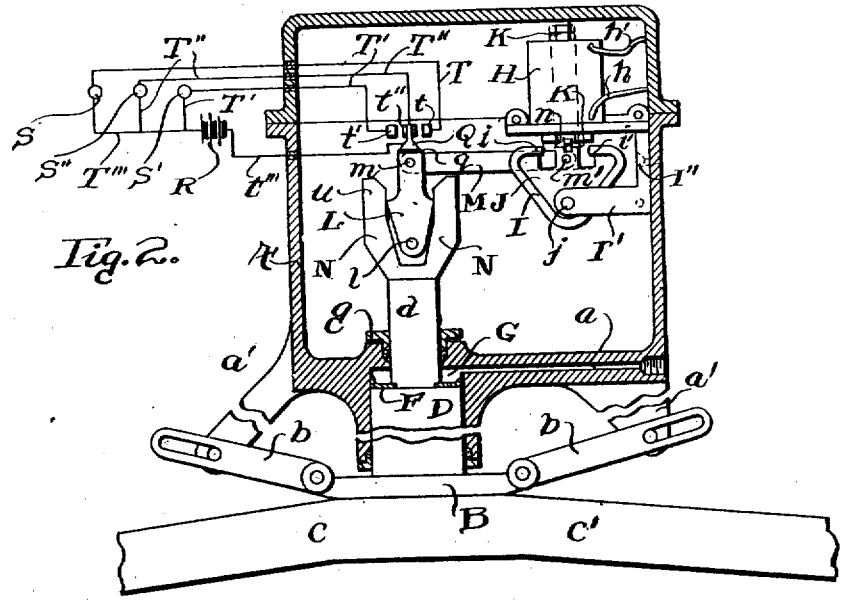
Fig. 2 is a vertical section of an embodiment of this invention, with a diagram of signals controlled thereby, with the several members of the apparatus in neutral position, and the shoe co-acting therewith in its extreme upward position, with a short section of the co-acting track side installation in elevation.

A reference character applied to designate a given part indicates said part throughout the several figures of the drawings wherever the same appears.

The track and track side installations which are illustrated in Fig. 1, form no part of this invention, and are used to permit the operation of the constructions embodying this invention to be more readily understood.

Figure 3:
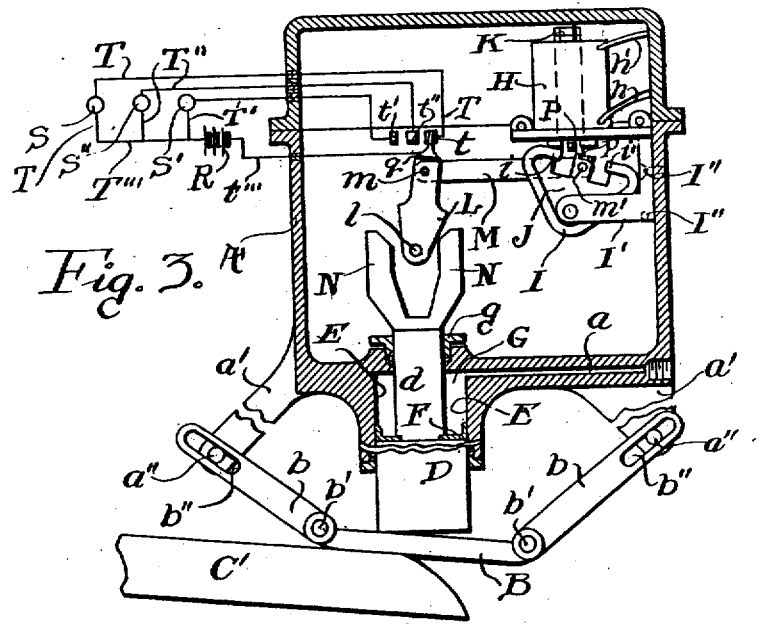
Fig. 3 is a similar view of the several elements which are illustrated in Fig. 2, in position with said shoe leaving said track side installation, with a newly set signal displayed.

A, Figs. 2 and 3, represents the shell or case of the apparatus which is positioned on a cab or motor so that the shoe B thereof may co-act with the track side installation C, C', illustrated as a ramp rail. *a* represents a passage way which, at the receiving end thereof is in communication with the air supply or train pipe of an air brake equipment. b, b, represent arms or levers which are pivotally attached at the lower ends thereof to the ends of shoe B, by pivots b', b'. The arms or levers b, b, are provided with slots b", b", adjacent to the upper ends thereof, and pivots a", which are rigidly mounted in arms a', a', of shell or case A, extend through said slots. Shoe B is thus suspended by said arms b, b, when said shoe is not in contact with a ramp rail C, C', and when said shoe is in contact with a ramp rail said mounting of the shoe permits it to travel up the ascending side C of the ramp, and to follow down the descending side C' thereof. D, d, represent a plunger of two diameters, which is movable longitudinally in a cylindrical passageway (E), provided therefor in the bottom of shell or case A. F represents an air retaining cup which is positioned on the annular table formed by the junction of parts D and d of the plunger; and G represents a sealed air chamber surrounding part d of the plunger. g represents a gland around said part d of the plunger. The passage way a communicates with chamber G, and hence, train pipe pressure exists in said chamber. The purpose and function of said chamber and its contents, is to yieldingly force plunger D, d, down, on to shoe B, and to force said shoe into close contact with the ascending and descending sides, (C, C'), of the ramp rail as said shoe travels thereon. This close contact of the shoe and ramp is particularly desirable when said shoe is on the descending side of the ramp, to obtain such contact as will ensure a continuous electrical circuit from said ramp to the shoe and to the coils of an electromagnet (H). The cab carried elements of this partial electric circuit comprises shoe B, suspending arms b, b, supports a', a', walls of shell or case A, and conductor h to the coil of electromagnet H; and from said coil the conductor h' to the frame of the engine or motor on which the apparatus is mounted; and thence to one of the rails of the track.

I represents a permanent magnet, which is mounted on frame J, and said frame is movably mounted on bracket I', by pivot j. The bracket I' is rigidly secured to shell or case J, as by screws or bolts I", I". K represents the pole piece of electromagnet H; and i, i', respectively represent the plus and minus poles of permanent magnet I; said magnet being permanent, the poles thereof do not change, and are selectively attracted to and repelled by the pole piece K of electromagnet H, said attraction and repulsion being selectively controlled by the direction of the flow of electrical current through the coils of said electromagnet, and said direction of flow being determined by the direction of flow of current through part C' of the ramp rail. What I term the neutral position of the movable members, including the permanent magnet I, is obtained by means of pivoted lever L, and link M. Lever L is pivotally mounted on pivot l, said pivot being stationary, and said lever is connected to frame J by said link M, which is mounted on pivots m, m'. N, N, represent the forked upper end of plunger D, d. As is well illustrated in Fig. 3, when plunger D d, is raised to its extreme upward travel on ramp rail C C', the forked end N, N, of said plunger forces the lever L into said position, termed neutral.

Frame J is provided with recess P, and p represents a pivotally mounted latch which, by gravity, falls into said recess, when frame J is in its neutral position with said recess underneath the latch.

The frame J and permanent magnet I, are thus locked in neutral position so long as latch p is in recess P, and said latch comprises soft iron to form an armature to pole piece K of electromagnet H, and is attracted to said pole piece whenever the pole piece is energized by an electric current flowing through the coil of the electromagnet, in whichever direction said current flows; and thereby, when said pole piece is energized, said latch is raised out of the recess to permit magnet I to swing to the right or left (as viewed in Figs. 2 and 3), corresponding with the direction of flow of the electrical current through the coil of the electromagnet H.

Q represents a body of electric conducting material which is mounted on the upper end of lever L, but electrically separated therefrom by insulation q.

R represents a battery or other electrical generator; S, S', and S", respectively represent signals, which are illustrated as lamps designed to be lighted, when energized.

T, T', and T" represent conductors which extend from terminals t, t', t", to signals S, S', S", respectively, and from said signals to the conductor T''', which extends to the battery R. t''' represents a conductor which extends from battery R to conducting body Q.

Referring to Fig. 1, U represent track batteries, U' and u' conductors from batteries U, U, to rails X, X', respectively. V, v, indicate track side relays. V', v' V", v" represent movable conductors which are respectively controlled by relays V, v. u, u, indicate trackside batteries, and u" conductors from the positive side of said batteries to the movable conductors V', V'. W', w'. indicate the contact points of movable conductors V', v', and u''' the conductor from contact point W' to movable conductor V". Conductor u''' is branched from conductor u'''' which extends to relay v of a preceding block. U''' represents a conductor from trackside relay $v$ to the negative side of battery $u$; and $U''''$ a conductor from contact point $w'$ to movable conductor $v''$. Movable conductors $V''$, $v''$ are provided with contact points $W'''$, $w'''$, $W''''$, $w''''$. $u''''$ indicates a conductor from relay $v$ which is branched at $u'''$ to connect with contact point $W'$ and movable conductor $V''$. $U'''''$ indicates a conductor from contact points $W''$, $w''$, to side $C'$ of ramp $C C'$, said conductor being branched to extend to both said contact points. $u'''''$, represents a conductor which extends from rail $X$ and is branched to contact points $W'''$, $w'''$. $Y$, $y$, indicate conductors from relay $V$ to rails $X$, $X'$, respectively. $y'$, indicates a conductor from the conductor $U'''$ on the negative side of battery $u$ to movable conductor $v'$. The coil of electromagnet $V$ of a given block is energized by battery $U$, being shunted when the rails are electrically connected by a motor, engine or train on said rails. The coil of electromagnet $v$ of a given block is energized by battery $u$ of the next block in advance when the track side installation of which said coil and battery are elements is continuous, as is illustrated in Fig. 1, where (block 3 being clear) the coil of electromagnet $V$ is energized by battery $U$ of said block 3, and the movable conductor $V'$ is in contact with contact point $W'$ of said block 3, and the circuit comprising battery $u$ of block 2, conductor $u''$, movable conductor $V'$, contact point $W'$, conductor $u'''$, the coil of electromagnet $v$ of block 2, and conductor $U'''$ to said battery $u$ is closed; thereby energizing the coil of electromagnet $v$ of block 2.

Assume train or cab $X''''$ to be in block 4, (Fig. 1), and that the train or cab $X'''$ is in block 1, and is equipped with the control device illustrated in Figs. 2 and 3, and is moving towards block 4. The device will operate at the signal points where ramps $C$ $C'$ are installed in blocks 1, 2 and 3, as follows. The conductor body $Q$ is normally in contact with the contact point $t$, (the track being normally clear), and as the shoe B engages the ascending side $C$ of ramp $C C'$ in block 1, lever $L$ is mechanically moved, (by fork $N$, $N$), into neutral position, as in Fig. 2. In this position the conductor body $Q$ is in electrical contact with contact $t''$. As the shoe engages the descending side $C'$ of said ramp, the plunger $D$ $d$ starts down, the pressure of air in chamber $E$, on cup $F$ assisting gravity in said downward movement. The downward movement of the plunger releases lever $L$, permitting a turning movement of said lever to the right or to the left, (as viewed in Fig. 3). By referring to the drawings, Fig. 1, it will be observed that the roadside installation in this instance is set to allow current to flow from the positive side of battery $u$ in block 1 to section $C'$ of the ramp in block 1, and the engagement of shoe B with said section or side will complete a circuit comprising the following elements: from the positive side of battery $u$, conductor $u''$, movable conductor $V'$, contact point $W'$, conductor $u'''$, movable conductor $V''$, conductor $U'''''$ side $C'$ of ramp $C C'$, shoe B, the shell or case $A'$, conductor $h$, coil of electromagnet H, conductor $h'$ to the frame of the engine or cab, the wheels of said engine or cab to rail X, rail X to conductor $u'''''$, conductor $u'''''$ to contact point $w'''$, movable conductor $v''$, conductor $U''''$, contact point $w'$, movable conductor $v'$, conductor $y'$, conductor $U'''$ back to the negative side of battery $u$.

The flow of current in the above traced direction will cause the electromagnet H to attract the armature latch P, to move it out of recess $p$ and unlock frame J (carrying permanent magnet I), and the permanent magnet will be attracted to the electromagnet pole K, and will turn to bring the conducting body Q into contact with the clear signal contact $t$. The permanent magnet will be continuously held in this position until the next signalling point is reached because the pole $i$ of said magnet will continuously attract the core piece K of the electromagnet H. This will cause a continuous clear signal to be displayed between the signal points in blocks 1 and 2. Should the train $X''''$ remain in block 4, as illustrated, and train $X'''$ advance to the signal point $C C'$, in block 2, the direction of the flow of the current from the roadside battery is reversed. That is, the ramp is, in this instance, connected to the negative side of the battery, due to the operation of the roadside control elements. The closed circuit, in this instance, includes,—starting from the positive pole of battery $u$, in block 2,—conductor $u''$, movable conductor $V'$, contact point $W'$, conductor $u'''$, movable conductor $V''$, contact point $w'''$, conductor $u'''''$, the track rail X, wheel of the cab, train or motor, conductor $h'$ to coil of electromagnet H, conductor $h$, shell or case A, shoe B to side $C'$ of ramp $C C'$, conductor $U'''''$, contact point $w''$, movable conductor $v''$, conductor $U''''$, contact point $w'$, movable conductor $v'$ conductor $y'$ and conductor $U'''$ to the negative side of the battery. As the shoe rides over the descending side of the ramp the flow of the current through the coils of the electromagnet H is, therefore, in the opposite direction from the first instance and the permanent magnet will, therefore, be turned in the opposite direction, (to the left), which puts the conductor body Q in contact with contact $t'$, and caution signal $S'$ is energized. As the shoe B leaves side $C'$ of the ramp body Q is held in its position, energizing signal $S'$, between said signal point and the next one by the attraction of the pole piece of the electromagnet to the permanent magnet, and a caution signal will be continuously displayed until the next signal point is reached.

Should train X'''' remain in block 4, as illustrated, as the train X''' advances to the ramp C C' in block 3, the lever L will be moved to neutral position, as before, by mechanical action on the approaching side, C, of the ramp, and will be locked in this position by the latch p engaging in notch or recess P. In this instance the current from the roadside battery u in block 3 is cut off at the relay V, in block 4, due to the shunting of the coil of said relay by said train X''''. Electromagnet H will not be energized as the shoe rides over the descending side of the ramp and lock p will remain in engagement with notch or recess P, and will retain the body Q in neutral position; (indicating danger), until the next signal point is reached.

I claim;

1. A permanent magnetic member movably mounted, an electromagnetic member rigidly mounted and arranged to be responsive to a roadside source of electrical energy, and to co-act, when energized, with said permanent magnetic member to move said permanent magnetic member to a selected position and the pole of said electromagnetic member arranged to form, when de-energized, the armature of said permanent magnetic member, to maintain it in said selected position.

2. A permanent magnetic member movably mounted, an electromagnetic member, a roadside member arranged to be responsive to a roadside source of electrical energy, said electromagnetic member responsive to said roadside member and arranged to co-act with said permanent magnetic member to move said permanent magnetic member to a selected position, and the pole piece of said electromagnetic member arranged to maintain said permanent magnetic member in its selected position, and said roadside member arranged to move said permanent magnetic member to a neutral position, and an armature responsive to said electromagnetic member arranged to lock said permanent magnetic member in said neutral position, all combined as set forth.

3. An electromagnetic member, a permanent magnetic member, and a mechanically locking member, said locking member arranged to hold said permanent magnetic member in a neutral position and said electromagnetic member arranged to control said mechanically locking member and to co-act with said permanent magnetic member to selectively move said permanent magnet to a determined position.

4. An electromagnetic member and a movably mounted permanent magnetic member, in combination with a roadside member, said electromagnetic member arranged, when energized, to selectively move said permanent magnetic member, and the pole piece of said electromagnetic member arranged to retain said permanent magnetic member in the selected position thereof, means comprising said roadside member to move said permanent magnetic member to a neutral position and means comprising a mechanical locking member responsive to said electromagnetic member to hold said permanent magnetic member in said neutral position.

5. An electromagnetic member, a permanent magnetic member, a mechanical locking member and a roadside member, said locking member controlled by said electromagnetic member, and said electromagnetic member arranged to co-act with said permanent magnetic member to move said permanent magnetic member to a selected position, means comprising the pole piece of said electromagnetic member to retain said permanent magnetic member in said selected position, in combination with means co-actuable with said roadside member to move said permanent magnetic member to a neutral position, and said locking member arranged to hold said permanent magnetic member in said neutral position, and to be moved from its locking position on the energizing of said electromagnetic member.

6. A movably mounted permanent magnetic member, an electromagnetic member adapted to be selectively energized and to selectively move said permanent magnetic member, and a mechanical locking member arranged to be controlled by the energizing of said electromagnetic member, in combination with mechanical means to move said permanent magnetic member from its selected position to a neutral position, and said mechanical locking member arranged to lock said permanent magnetic member in said neutral position, the said electromagnetic member not being energized.

7. A permanent magnetic member movably mounted and an electromagnetic member rigidly mounted and arranged to be responsive to a roadside member to be selectively energized thereby, and said permanent magnetic member responsive to said roadside member to be moved to a neutral position thereby, and a mechanical locking member, responsive to said electromagnetic member, arranged to automatically lock said permanent magnetic member in said neutral position, in combination, with a roadside member and a roadside source of electrical energy.

8. A train carried apparatus comprising an electromagnetic member and a permanent magnetic member, said members relatively movable, in combination with a roadside member and means to selectively control the energizing thereof, said magnetic members co-actuable, and means co-acting with said roadside member to energize said electromagnetic member correspondingly with the energizing of said roadside member, to move one of said magnetic members to a selected position, and means co-acting with said roadside member to move said movable magnetic member to neutral position and a locking member responsive to said electromagnetic member, arranged to automatically lock said permanent magnetic member in said neutral position.

9. A roadside member and a plurality of magnetic members one of said members movably mounted and arranged to be magnetically responsive to the other member, and said other member responsive to the electrical condition of said roadside member, in combination with a control member, said control member connected to said movable magnetic member to be moved to a selected position by the movement of said movable magnetic member, and said roadside member arranged to co-act with said control member to move said movable magnetic member to a neutral position and a locking member responsive to said electromagnetic member, arranged to automatically lock said permanent magnetic member in said neutral position.

10. A roadside member and a plurality of magnetic members, one of said members immovably mounted and one movably mounted, said movably mounted member arranged to be responsive to the magnetic condition of said immovable member and said immovable member responsive to the electrical condition of said trackside member, in combination with a control member, said movable member and said control member connected, to move said control member to a selected position on the movement of said movable member, and said control member arranged to be mechanically moved to a neutral position by said roadside member and to move said movable member to a neutral position, and mechanical means to automatically lock said movable member in said neutral position, said locking means responsive to the magnetic condition of said immovable member.

11. A roadside member and a plurality of magnetic members, one of said members immovably mounted and one movably mounted, said movably mounted member responsive to the magnetic condition of said immovably mounted member and said immovably mounted member responsive magnetically to the electrical condition of said roadside member, in combination with a control member and means connecting said movable magnetic member and said control member to move said control member to a selected position on the movement of said movable member, magnetic means to maintain said movable magnetic member in a selected position and said roadside member arranged to mechanically move said control member to a neutral position and means responsive to the magnetic condition of said immovable magnetic member to automatically lock said movable magnetic member in said neutral position.

12. A roadside member, a mechanically locking member and a plurality of magnetic members, one thereof immovably and one movably mounted, and said locking member controlled by said immovably mounted magnetic member and said immovably mounted magnetic member responsive magnetically to the electrical condition of said roadside member, and said movably mounted magnetic member responsive to the magnetic condition of said immovably mounted magnetic member, in combination with a control member connected to and arranged to be moved to a selected position by said movably mounted magnetic member, magnetic means to retain said movably mounted magnetic member in said selected position, and means co-actuable with said roadside member to mechanically move said control member to a neutral position, and said mechanically locking member arranged to lock said movable menbers in said neutral position.

13. A train apparatus comprising an electromagnetic member, a movably mounted permanent magnetic member and a mechanical locking member controlled by said electromagnetic member, in combination with a roadside source of electrical energy and roadside members at stated intervals along the trackway, said electromagnetic member arranged to be responsive to the electrical condition of said roadside members, and to move said permanent magnetic member to a position corresponding to said electrical condition thereof, and said permanent magnetic member when in said selected position responsive to said electromagnetic member to be retained therein magnetically, with means co-actuable with said roadside member to move said permanent magnetic member to a neutral position engageable with said locking member.

ANDREW J. BROOKINS.

Witness:
CHARLES TURNER BROWN.